July 4, 1967  L. C. SHEWEY  3,329,511
FROZEN FOOD PRODUCT
Filed April 3, 1964
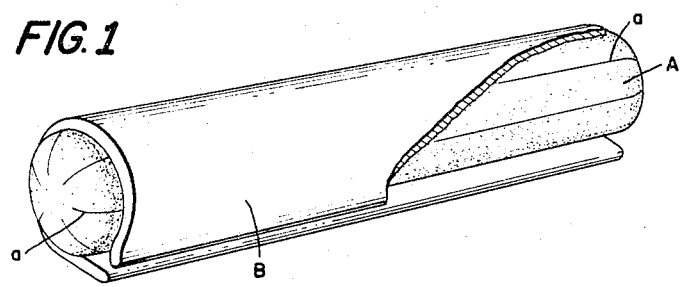
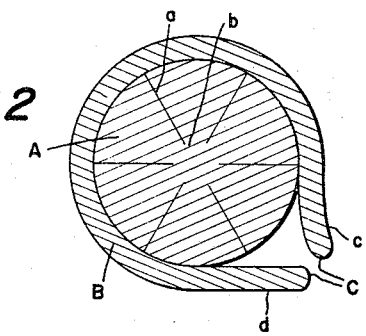
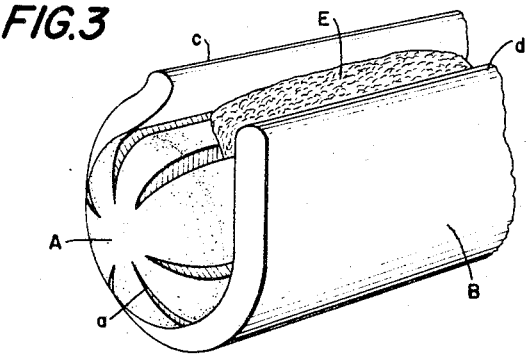
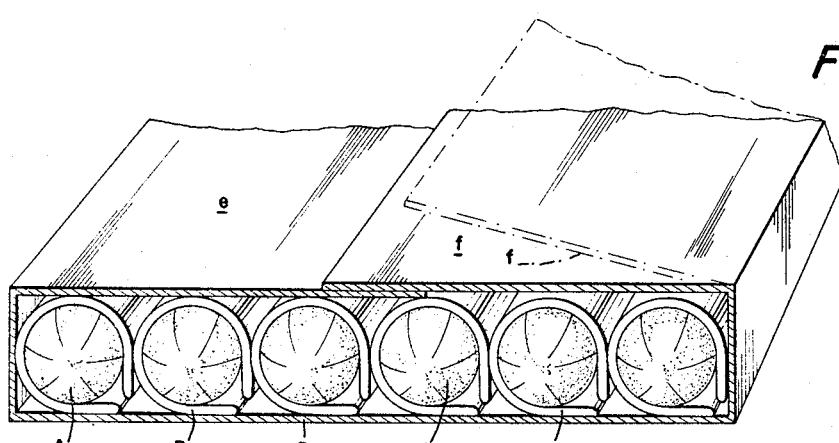
INVENTOR
LOYD C. SHEWEY
BY Ralph T. Barrett
ATTORNEY 3,329,511
FROZEN FOOD PRODUCT
Loyd C. Shewey, Boise, Idaho, assignor, by direct and mesne assignments, to Loyd C. Shewey, Norris White and Schiller, Young & Williams, a firm
Filed Apr. 3, 1964, Ser. No. 357,033
1 Claim. (Cl. 99—194)

This invention relates to the preparation of a food product and more particularly a food product to be sold in a frozen state and preferably in packages.

More specifically, the invention comprehends a commodity embodying a wiener wrapped with raw dough, the wiener first being mechanically treated and the dough wrapped thereabout in a novel manner for freezing and eventual cooking in a tray or plate, as by baking.

Another object of the invention is the preparation of the wiener prior to wrapping which includes the use of a plurality of longitudinally extending straight slits or a spiral slot which extends substantially into the body of the wiener but leaves a central solid core for retaining the structure in its normal form while permitting the quick penetration of heat during the cooking operation.

Another feature of the invention is the specific manner in which the flat sheet of dough is wrapped about the wiener for practically its entire length, although it is preferable to leave the ends exposed to facilitate cooking, the sheet of dough having its adjacent marginal edges spaced apart and preferably outwardly flared to permit expansion of the wiener and the wrapping during the cooking operation and presenting a desirable appearance as well as providing a trough-like area for the application of mustard, ketchup or other condiments.

Another object of the invention is to provide at least a portion of the scored wiener exposed in the trough-like portion of the structure so that after the cooking operation the meat of the wiener will present a desirable and appetizing appearance.

Another object of the invention is to provide the dough wrapper about the wiener with a flattened side portion which will provide a supporting area, both in packaging and in positioning in a pan or on a tray if not cooked in its original package.

These and other objects of the invention will more clearly hereinafter appear by reference to the accompanying drawings forming a part of the instant specification and wherein like characters of reference designate corresponding parts throughout the several views, in which:

FIG. 1 is a perspective view, partly in section, showing the assembly prior to packaging;

FIG. 2 is a transverse section of the structure of FIG. 1;

FIG. 3 is a perspective view of one end of the wiener after having been cooked and showing the adjacent edges of the dough wrapper expanded outwardly with condiments placed therebetween; and FIG. 4 is a perspective view showing a package of wieners in a wrapper which may be of foil or any other suitable material.

The structure of the invention comprehends the use of a wiener or frankfurter body A which has been formed with a plurality of scores or slits $a$ which extend longitudinally of the wiener structure and across the ends thereof. It will be understood that in lieu of the longitudinal slits shown in the present disclosure, a close spiral or a plurality of spiral scores or slits can be formed throughout the wiener body and extending longitudinally thereof, it being understood that these scores or slits each terminate at a point spaced from the center of the wiener as shown at $b$ in FIG. 2, whereby the wiener structure is maintained in its original unit form.

Wrapped about the wiener body is a square or oblong sheet of dough B which may be formed of any suitable yeast dough formula commonly used in the composition of hot rolls or bread. This dough is normally kneaded down and rolled out to a thickness of approximately $5/32$ of an inch before being wrapped about the wiener by any suitable process of manufacture. The sheet of dough B wrapped about the wiener A has its adjacent edges normally spaced apart as shown at C, at least one marginal edge $c$ being slightly flared outwardly while the other edge $d$ may lie in a flat plane, as best shown in FIG. 2, to provide a supporting area which will retain the wiener in a flat position in the package or pan and prevent its displacement.

In FIG. 4 there is shown a series of six wieners contained in a package D, the package having flaps $e$ and $f$ bent over. The specific form of container forms no part of this invention, it being desirable, however, to provide a container of aluminum foil or other suitable material which, when opened, can be used as a receptacle for baking the wieners contained therein.

In FIG. 3 there is illustrated a fragmentary perspective of the present food commodity after it has been baked and which shows the slits $a$ partially opened due to expansion during the cooking operation. This figure likewise shows the lips $c$ and $d$ separated substantially due to the expansion of the wiener A as well as due to natural expansion of the dough during the cooking operation, thus providing a substantial area in the form of a trough along the surface of the wiener in which mustard, ketchup, relish or other condiment or flavoring material can be placed as indicated at E.

The process of making the instant commodity will be substantially as follows. The raw yeast dough or other desirable dough will be rolled to a thickness of approximately $5/32$ of an inch and will be cut in a size and shape to cover any of the various sizes of wieners now marketed. The wiener will be encased in the raw dough after scoring by any rapid and economical process of manufacture, providing, of course, that the dough wrapped about the wiener will leave the ends of the wiener exposed. The exposure of the ends of the wiener may be by having the dough sections shorter than the wiener or by having the dough project beyond the wiener but not bent over the ends thereof. This arrangement facilitates the transmission of heat through the wiener which permits faster cooking or baking, as well as transmission of cold for faster freezing of the product.

It is further necessary in wrapping or covering the wiener with dough that a full length open seam or joint be left in the dough juncture of the edges, this open seam or joint being provided preferably along one side at the bottom edge of the product and generally parallel to a baking pan or container, as shown in the drawings.

It will be noted that in addition to the open seam the dough adjacent one of the marginal edges is left flat throughout the length of the wiener structure to provide a base area for supporting the commodity. The provision of the open seam or joint, shown at the bottom edge of the assembly, is to allow the heat, as well as the cold during the freezing operation, to rapidly attack the full length of the wiener. Also, this seam when opened during the baking or cooking operation presents a distinctive and appetizing appearance, particularly where this gap presents a portion of the slit wiener resulting from the scoring $a$ formed in the wiener body, and in addition provides a trough for a suitable condiment, such as ketchup, mustard, pickles or the like.

It is believed that the present invention comprehends a very desirable, heretofore unknown and useful commodity which can be easily manufactured and quickly ozen and cooked because of the novel construction and arrangement of the parts from which it is formed. The invention also provides for the use of freshly cooked bread over freshly cooked meat. This distinguishes from the conventional so-called "hot dog" in which a cooked wiener is placed into a previously cooked bun. In fact, the instant invention insures both fresh bread and fresh meat.

In addition, inasmuch as the present commodity is to be prepared, packaged and sold as a frozen product, it will substantially reduce much needed storage space in the conventional household, as separate containers and space are needed for the usual wieners and buns. It is believed that the present product will be ideally suited to barbecue meals as well as general all around home and institutional cooking requirements.

What I claim is:

The method of forming a frozen food commodity adapted for cooking before eating to render it edible comprising the steps of:

(a) Providing a plurality of longitudinal slits throughout the length of a wiener, said slits extending along the entire length of the wiener and extending radially inwards a distance so as to leave a solid central mass throughout the length of the wiener, whereby the wiener is retained in unit form at all times;

(b) Preparing a sheet of raw dough, said raw dough having a length less than the length of said wiener and a width greater than the circumference of said wiener;

(c) Wrapping said sheet of dough about the wiener intermediate its ends so that the ends of said wiener are exposed at all times, said wrapping being effected so that a slit in said wiener is in alignment with the opening defined by the adjacent longitudinal edges of the sheet of dough;

(d) Turning at least one of said adjacent edges of the sheet of dough laterally outward, whereby a longitudinal trough is formed between said edges and the underlying slit in the wiener;

(e) Providing the dough near the other adjacent edge with a flat portion to serve as a supporting area to prevent movement of the commodity when it is positioned thereon; and (f) Freezing the commodity to preserve the same ready for quick cooking.

References Cited

UNITED STATES PATENTS

| | | | |
|---|---|---|---|
| 1,816,283 | 7/1931 | Holibaugh | 99—87 |
| 2,675,580 | 4/1954 | Pesce. | |
| 2,810,338 | 10/1957 | Dawson. | |
| 3,135,614 | 6/1964 | Parisi et al. | 99—192 |

OTHER REFERENCES

Betty Crocker's Picture Cook Book, McGraw-Hill Book Company, Inc., New York, 1st Edition, 1950, pp. 68 and 278, TX 715 c7.

Rombauer et al., The Joy of Cooking, The Bobbs-Merrill Company, Inc., New York, 1953, p. 152, TX 715 R 75.

A. LOUIS MONACELL, *Primary Examiner.*

RAYMOND N. JONES, *Examiner.*